United States Patent Office 2,952,635
Patented Sept. 13, 1960

2,952,635
PROCESS FOR PREVENTING CORROSION OF FERROUS METALS AND COMPOSITION THEREFOR

John D. Spivack, Spring Valley, N.Y., and Harry Kroll, Warwick, R.I., assignors to Geigy Chemical Corporation, Yonkers, N.Y., a corporation of Delaware No Drawing. Filed Mar. 29, 1957, Ser. No. 649,317

12 Claims. (Cl. 252—8.55)

The present invention relates to the inhibition of corrosion of metals, particularly iron, steel and ferrous alloys. The corrosion inhibitors contemplated herein find special utility in the prevention of corrosion of pipe or equipment of metal which is in contact with a corrosive oil-containing medium, as for example, in oil wells producing corrosive oil or oil-brine mixtures, in refining processes and the like.

In the production of oil and gas, soluble sulfides, carbonates and other materials are often produced from subsurface formations, and, in the presence of brine, increase the corrosive attack of ferrous metal conduits and other auxiliary equipment with which the crude oil or gas comes in contact. Thus brine produced along with such crude oil or gas containing corrosive sulfides and carbonates are especially corrosive to oil well equipment. However, wells producing relatively little brine show severe corrosion due to the presence of dissolved corrosive gases, and their constituents, such as hydrogen sulfide, carbon dioxide, organic acids, mercaptans, etc.

The corrosion inhibitors of the present invention possess properties which impart to metals, particularly ferrous metals, resistance to attack by a variety of corrosive agents such as brines, inorganic acids, and the constituents to be found in corrosive oil and gases.

In its broadest aspect our invention contemplates a process for preventing corrosion of metals, particularly ferrous metals, by applying to such metal surfaces N-substituted alkylarylalkyl polyamines or by adding the N-substituted alkylarylalkyl polyamines to the corrosive environment. This type of inhibitor is superior in its protective action to that of the high molecular weight aliphatic amines, such an n-octadecylamine, disclosed in U.S. Patent #2,460,259, and the aliphatic polyethylenepolyamine, n-octadecyldiethylenetriamine.

The inhibitors of the present invention are N-alkylarylalkyl substituted alkylene polyamines represented by the following formula:

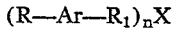

in which R represents 1–2 aliphatic groups of 4 to 30 carbon atoms, Ar represents either benzene or naphthalene, $R_1$ represents a saturated alkylene radical of 1–5 carbon atoms, X represents an alkylene polyamine or polyalkylene polyamine residue in which successive nitrogens are separated by alkyene groups of 1 to 6 carbon atoms and is represented by the empirical formula

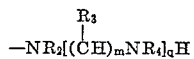

in which $R_2$, $R_3$, and $R_4$ may be hydrogen, hydroxyalkyl, polyalkylene ether or an aliphatic hydrocarbon and in which $n$, $m$ and $q$ are in the range of 1 to 6; $n$ may also be fractional numbers greater than unity to represent mixtures of individual N-alkylarylalkyl substituted alkylene polyamines as described above. In such instances $n$ represents the average degree of substitution of the N-alkylarylalkyl alkylene polyamine. We prefer those inhibitors of the above general formula wherein $R_1$ represents a saturated alkylene radical of 1–2 carbon atoms, $n=1$ to 2, $m=2$, $q=1$ to 4, $R_2$ and $R_4$ respectively represent H or $(CH_2CH_2O)_pH$ where $p$ is 2 or less but not zero, and $R_3$ represents H or a lower alkyl group of 1–3 carbon atoms.

The inhibitors of our invention include the following: N - dodecylbenzylethylenediamine, N - dodecylbenzyldiethylenetriamine, N,N'-bis (dodecylbenzyl)diethylenetriamine, N,N',N''-tris(dodecylbenzyl)diethylenetriamine, N-dodecylbenzyltriethylene-tetramine, N,N'-bis-(dodecylbenzyl)triethylenetetramine, N,N'N''-tris (dodecylbenzyl)triethylenetetramine, N,N'N'',N''' - tetrakis (dodecylbenzyl) triethylenetetramine, N - dinonylnaphthylyldiethylenetriamine, N - dinonylnaphthylyltriethylenetetramine, N-dodecylphenylethylethylenediamine, N - dodecylbenzyl-1,2-propylenediamine as well as their hydroxyalkylated derivatives. The alkylene group given above is ethylene, but the list is not exhaustive and may include compounds having instead propylene, butylene, pentylene and hexylene groups.

Some of the inhibitors of the present invention may be conveniently made (synthesized) by condensing the long alkylbenzyl or alkyl naphthylyl chloride with the chosen alkylenepolyamine in the presence of sodium hydroxide. The alkyl group should contain four to thirty carbon atoms inclusive. Either the alkylene polyamines or the sub-generic polyalkylene polyamines may be used. In the ethylene polyamine series represented by the empirical formula, $NH_2(CH_2CH_2NH)_YH$, when Y is greater than 1 the polyamine contains secondary amino groups as well as primary amino groups. The appearance of some tertiary amino groups in some of our inhibitors, shown by analysis, indicates that alkylation of secondary amino groups may take place as well as alkylation of primary amino groups. The N-substituted alkylaryl polyamines of our invention may be single chemical compounds or may be a mixture of closely related chemical compounds resulting from alkylarylalkylation of the alkylene polyamines.

The inhibitors of our invention may be used as such to prevent rusting, or may be dissolved or dispersed in various vehicles or carriers.

Both polar and non-polar vehicles may be employed. Among the former are water, alcohols, such as methyl, ethyl propyl, isopropyl, butyl, amyl, hexyl, cyclohexyl, heptyl, methyl cyclohexyl, octyl, decyl, lauryl, myristyl, cetyl, stearyl, benzyl, etc. alcohols; polyhydric alcohols as ethylene glycol, propylene glycol, butylene glycol, glycerol, methyl glycerol, as well as the polyethylene glycol polymers, etc.; phenols and various alkyl phenols; ethers as diethyl ether, diisopropyl ether, and the corresponding methyl ethers of ethyleneglycol, diethylene glycol, triethylene glycol, etc., as well as the corresponding ethyl, propyl, butyl ethers; neutral esters of carboxylic and other acids as ethyl, propyl, butyl, amyl, phenyl, cresyl, such as the higher acetates, propionates, butyrates, lactates, laurates, myristates, palmitates, stearates, oleates, ricinoleates, phosphates, phosphites, thiophosphates, carbonates; as well as the synthetic diesters, for example, diisoamyl adipates, sebacates, dibutyl and didodecyl phthalates, etc.; silicones, natural waxes as carnauba wax, candelilla wax, japan wax, jojoba oil, sperm oil, glyceride oils and fats as tallow, lard oil, olive oil, cottonseed oil, perilla oil, linseed oil, tung oil, soya bean oil, flaxseed oil, etc.; weak bases as pyridine, alkyl pyridines, quinolines and petroleum bases, etc. This list is not exhaustive.

Vehicles of little or nor polarity are exemplified by the hydrocarbons such as pentanes, hexanes, heptanes, octanes, benzene, toluene, xylenes, cumene, indene, hydrindene, alkylbenzenes and alkyl naphthalenes, kerosene, gas oil, lubricating oils, fuel oils, petrolatum, paraffin wax, asphalt, etc. This list is not exhaustive.

As pointed out supra one of the main uses of the inhibitor of the present invention is in prevention of corrosion in oil and gas well equipment. An effective amount of the alkylaryl-alkyl substituted alkylene polyamine is incorporated in the well. One method of injecting it is to dissolve or disperse it in a suitable liquid vehicle which injection may be either continuously or intermittently, the former being preferred. It may be introduced into the annulus of the well between the casing and the producing string where it becomes intimately admixed with the well fluid and may be pumped or flowed from the well with the corrosive fluid. It may be introduced in a suitable solvent into the annulus by means of a mechanical pump.

The amount of the inhibitor to be employed depends on the corrosivity of the corrosive solution. The amount thereof necessary to protect adequately the metal surfaces to which it is applied will be only a small concentration in the corrosion fluid. For example, an amount from about 0.0001% to about 0.005% by weight will give effective protection in most corrosive fluids produced from subsurface formations.

The inhibitors of the present invention may also be formulated into solid stick form for certain situations, as for use in certain types of well where introduction thereof in liquid form is impractical. For the stick form, in addition to the organic components such as the alkylarylalkyl alkylene polyamine and oxidized wax esters, various inorganic materials may be present in the role of weighting agents, such as barium oxide, barium sulfate, lead oxide or powdered metallic lead. An oxidized wax having a saponification value of about 50 to 180, and a hardness, as determined by needle penetration (100 gm. weight, 5 secs.) of less than 50 min., more particularly having a saponification value between 80 and 170 and needle penetration value between 5 and 20 are suitable for the purpose. Such oxidized waxes are described in U.S. Patent No. 2,599,385, issued June 3, 1952. Eminently satsifactory products can be formed from the three components outlined above, in proper proportions, which are from 20 to 65 parts of this substituted polyamine inhibitor to 80 to 35 parts of the oxidized wax with an amount of weighting material to give the desired density, for example 60 to 125 parts of litharge. It is desirable to have a density of about 1.5–2.0. The addition of polymeric material which confers toughness to the solid stick, such as polyethylene, cellulose esters or ethers in minor proportions, for example 10–20% of such material, based on the total of the constituents of the stick, excluding the weighting material, is in some cases advantageous.

The alkylarylalkyl polyamines of this invention may be used in association or conjunction with organic carboxylic acids such as the unsaturated and saturated fatty acids, for example, caprylic, capric, lauric, myristic, palmitic, stearic and behenic acids, oleoic, linoleic, dilinoleic and linolenic acids, as well as synthetic or petroleum derived sulfonic acids, such as dodecylbenzenesulfonic acid, petroleum sulfonic acids both oil-soluble and water-soluble types, etc., as well as the petroleum derived naphthenic acids. This list is not intended to be exhaustive. The particular acids selected for use are dictated by technical considerations of specific uses and applications as well as economic factors. For example, the use of a specific organic acid may increase the state of dispersion of the inhibitor or inhibitor concentrate in the presence of oil-well brines.

The following examples illustrate the production of the type of chemical compositions of the present invention and taken in conjunction with the tests the effectiveness of them as corrosion inhibitors.

The dodecylbenzyl chloride used in the following examples to prepare some of our corrosion inhibitors is a commercial material obtained from the Petrochemical Department of the Continental Oil Company. This intermediate had the following properties:

| | |
|---|---|
| Color | Pale yellow. |
| Apparent molecular weight | 292. |
| Percent chlorine | 11.6. |
| Sp. gr. @ 60° F. | 0.959. |
| Flash point, C.O.C. | 335° F. |
| Pour point | −60° F. |
| Viscosity: | |
| @ 100° F. | 79.4 SSU. |
| @ 210° F. | 35.8 SSU. |
| Distillation range | 118–175° C. at 2 mm. Hg. |
| Solubility | Most organic solvents. |
| Activity | >90%. |

EXAMPLE I

*N-dodecylbenzylethylenediamine*

Dodecylbenzyl chloride (100 grams, 0.33 mole) and 46% aqueous sodium hydroxide (33.6 grams, 0.39 mole) were added over a period of 37 minutes to ethylenediamine (98%, 101.5 grams, 1.69 moles) at reflux temperature of about 120° C. The precipitated salt was filtered out, and the water and unreacted ethylenediamine removed from the filtrate by distillation at atmospheric pressure, the last traces being removed at about 20 mm. Hg pressure. The residue from the aforesaid distillation was filtered once again. This filtrate, a yellow liquid, was soluble in kerosene, benzene and isopropanol but insoluble in water. Analysis indicated that the product was substantially monododecylbenzylated ethylenediamine, having on the average 1.1 dodecylbenzyl groups per mole ethylenediamine reacted.

EXAMPLE II

*N-dodecylbenzyl diethylenetriamine*

Dodecylbenzyl chloride (1029 grams, 3.48 moles) and fifty percent aqueous sodium hydroxide (336 grams, 4.2 moles) were added dropwise simultaneously over a period of 70 minutes to diethylenetriamine (1273 grams, 10.5 moles) which had previously been heated to 120° C. The temperature was maintained at 121±2° C. during the addition period, and heating at this temperature was continued for 1 hour after the addition was complete. Sodium chloride precipitate was observed in the reaction flask during the addition and subsequent heating periods. The sodium chloride was filtered out, and the filtrate distilled at about 20 mm. Hg pressure to remove the bulk of the water (153 grams). The unreacted diethylenetriamine was then removed by distillation at a vapor temperature of about 65° C. at 1 mm. Hg pressure. The residue, weighing 1167 grams, was a yellow, viscous liquid. Analysis showed that it was substantially N-dodecylbenzyldiethylenetriamine, having 1.1 dodecylbenzyl groups per mole of diethylenetriamine reacted. The product was soluble in hexane, kerosene, benzene and methyl and ethyl alcohol but insoluble in water.

EXAMPLE III

*Mixture of dodecylbenzyldiethylenetriamines*

The procedure followed was substantially the same as given in Example II except that the quantities of reactants were as follows:

| | grams | moles |
|---|---|---|
| I—diethylenetriamine | 60.6 | 0.5 |
| II—dodecylbenzyl chloride | 147.2 | 0.5 |
| III—aqueous sodium hydroxide (50%) | 48.0 | 0.6 |

The product from the synthesis, a yellow liquid soluble in kerosene, benzene, hexane, and isopropanol and insoluble in water, weighed 143 grams. Analysis showed that on the average the product contained 1.6 dodecylbenzyl groups per mole diethylenetriamine reacted.

EXAMPLE IV

*Didodecylbenzyldiethylenetriamine*

The procedure followed was substantially the same as in Example III except that the temperature during addition of the dodecylbenzyl chloride and aqueous sodium hydroxide to the diethylenetriamine and subsequent heating temperature of the reacting component mixture were both 70° C.

The product from this synthesis, a yellow liquid soluble in kerosene, benzene, hexane and isopropanol and insoluble in water, weighed about 122 grams. Analysis showed that this product was substantially didodecylbenzyldiethylenetriamine.

EXAMPLE V

*N-dodecylbenzyltriethylenetetramine*

Dodecylbenzyl chloride (147 grams, 0.50 mole) and 42% aqueous sodium hydroxide (52 grams, 0.55 mole) were added simultaneously over a period of 50 minutes to triethylenetetramine (219 grams, 1.50 moles). The precipitated sodium chloride was filtered out. The filtrate was then distilled at water pump pressure (about 20 mm. Hg) to remove water. The unreacted triethylenetetramine was removed at a vapor temperature of 115 to 121° C. at about 1 to 3 mm. Hg. The residual product was a yellow oil soluble in kerosene, insoluble in water. Analysis showed that this product was substantially monododecylbenzylated triethylenetetramine, having 1.1 dodecylbenzyl groups per mole of triethylenetetramine reacted.

EXAMPLE VI

*Ethylene oxide adducts of monododecylbenzyl diethylenetriamine of Example II*

(a) Dodecylbenzyldiethylenetriamine of Example II (365 grams) was charged to a three-neck flask equipped with a mechanical stirrer, reflux condenser and gas inlet tube. After flushing the apparatus thoroughly with nitrogen, the substituted triamine was heated to 70° C. and ethylene oxide was bubbled through the liquid at 70 to 90° C. at a pressure of 1 to 2 cm. above atmospheric pressure as measured by a U-tube manometer fitted at the top of the reflux condenser. Under these conditions about 0.93 mole of ethylene oxide was added per mole of dodecylbenzyl diethylenetriamine. A sample was removed for testing as a corrosion inhibitor.

(b) The reaction mixture was then heated at 80° C. and ethylene oxide addition continued as before for two hours. Analysis of the product indicated that at this stage a total of 2.0 moles of ethylene oxide had been added per mole of dodecylbenzyldiethylenetriamine. A sample was removed for testing.

(c) The reaction mixture from (b) was then heated and ethylene oxide added at 110–115° C. for a period of 4 hours. Analysis of the product indicated that at this stage a total of 4.4 moles of ethylene oxide had been added per mole of dodecylbenzyldiethylenetriamine. A sample was removed for testing.

(d) The reaction mixture from (c) was heated and ethylene oxide added for a period of about 13½ hours at 110 to 120° C. Analysis of the product indicated that at this stage a total of 9.0 moles of ethylene oxide had been added per mole of dodecylbenzyldiethylenetriamine.

COMPARISON EXAMPLE

*N-octadecyldiethylenetriamine*

This compound was made for comparative purposes. N-octadecyl chloride (C.P. grade, 50 grams, 0.173 mole) was added dropwise over a period of two hours of diethylenetriamine (commercial grade—55 grams, 0.53 mole) maintained at 125° C. The reaction mixture was heated for an additional 1¼ hours. Aqueous 33% sodium hydroxide solution (22.5 g., 0.185 mole) was added with stirring at room temperature. After standing for about 16 hours the top organic layer solidified, the lower aqueous layer being decanted. The waxy solid was dissolved in ethanol, the precipitated sodium chloride being filtered. After removal of ethanol and unreacted diethylenetriamine by distillation, 53 grams of a light yellow waxy solid was obtained. Analysis showed that this product is essentially N-octadecyldiethylenetriamine. This product is not an inhibitor of the class or type which characterizes the present invention.

The products described in the examples above were tested for their corrosion preventive effectiveness by a widely adopted screening test specifically designed for corrosion inhibitors to be used in oil and gas wells. This test, initially proposed by J. C. Spalding and E. C. Greco of Committee T–IK of the National Association of Corrosion Engineers, is fully described in "Corrosion," vol. 11, page 57 (1955). Essentially the test is a static kerosene and water test utilizing the weight loss of a mild steel coupon when under the influence of an inhibited solution compared to an uninhibited solution of an aqueous 5% sodium chloride containing about 500 p.p.m. of hydrogen sulfide. The desired amount of inhibitor is dissolved in 100 ml. of kerosene and introduced into a 1000 ml. Erlenmeyer flask which has been flushed with pre-purified nitrogen. The brine (900 ml.) is then introduced to the bottom of the flask slowly to avoid splashing. A weighted steel coupon is then suspended on a hooked glass rod, which rod is affixed at its upper end to a rubber stopper, the coupon being held in the upper kerosene phase for ten seconds and then gently lowered into the brine phase while stoppering the flask. The steel coupon is allowed to remain in place for seven days at room temperature. It is then removed, cleaned with inhibited acid until free of corrosion product, then dried and finally weighed. The tests are run in duplicate and the average weight loss of duplicate runs calculated. The results are reported as follows:

(A) Percent protection:

$$100 - \left(\frac{\text{wt. loss test coupon}}{\text{wt. loss control coupon}} \times 100\right) = \text{percent protection}$$

(B) Appearance: The metal surface is examined visually using 25 to 100 power magnification. Results are reported by description of surface in regards to presence or absence and relative severity of pits and/or blisters.

The products described in the examples of this invention were tested at concentrations of 25 p.p.m. and at concentrations lower than this, the results being presented in Table I.

The corrosion test results of Table I show that the N-substituted alkylbenzyl polyamines offer excellent corrosion prevention to metal at low concentrations of their use. One of the preferred inhibitors, N-monododecylbenzyldiethylenetriamine of Example II affords good rust prevention in this test at the low concentration of 5 p.p.m. The preferred inhibitors of our invention offer much more effective corrosion prevention than two typical n-alkylamines, namely n-octadecylamine and N-octadecyldiethylenetriamine. Table I particularly demonstrates the superior effectiveness of one of the preferred products of our invention, N-dodecylbenzyldiethylenetriamine (Example II), compared to N-octadecyldiethylenetriamine (Comparison Example) which has approximately the same number of carbon atoms in the hydrocarbon radical. The substitution of an alkylarylalkyl radical for an aliphatic radical attached to polyalkylene polyamine thus radically increases the efficiency of the corrosion inhibitors and is one of the unexpected results of our invention.

It is to be understood that while the features of the

TABLE I.—CORROSION PREVENTION OF OIL AND GAS WELL INHIBITORS
[Spalding and Greco static test brine to kerosene ratio=9 to 1; corrosive gas—hydrogengas sulfide; room temperature]

| Inhibitor | Example No. | Percent Protection | | | Appearance of Metal Coupons | | |
|---|---|---|---|---|---|---|---|
| | | 25 p.p.m. | 10 p.p.m. | 5 p.p.m. | 25 p.p.m. | 10 p.p.m. | 5 p.p.m. |
| N-dodecylbenzylethylenediamine | I | 84 | 78 | not tested | no pits or blisters | no pits or blisters | not tested |
| N-dodecylbenzyldiethylenetriamine | II | 86 | 83 | 72 | ---do--- | ---do--- | no pits or blisters |
| Mixed dodecylbenzyldiethylenetriamines | III | 80 | 52 | not tested | ---do--- | ---do--- | not tested |
| didodecylbenzyldiethylenetriamine | IV | 77 | 67 | ---do--- | ---do--- | ---do--- | Do. |
| dodecylbenzyltriethylenetetramine | V | 86 | 65 | ---do--- | ---do--- | ---do--- | Do. |
| Reaction product of I+0.93 moles ethylene oxide | VIa | 75 | 61 | ---do--- | ---do--- | ---do--- | Do. |
| Reaction product of I+2.0 moles ethylene oxide | VIb | 71 | 11 | ---do--- | ---do--- | few pits or blisters | Do. |
| Reaction product of I+4.4 moles ethylene oxide | VIc | 33 | 0 | ---do--- | few blisters | pits and blisters | Do. |
| Reaction product of I+9.0 moles ethylene oxide | VId | 3 | 0 | ---do--- | not tested | ---do--- | Do. |
| N-octadecyldiethylenetriamine | VII | 58 | 0 | ---do--- | no pits or blisters | ---do--- | Do. |
| n-octadecylamine | | 64 | 53 | ---do--- | few blisters | few blisters | Do. | invention have been described and illustrated in connection with certain specific examples, however it will be understood that various changes and modifications, as well as different reactants, are possible and will be apparent to one skilled in the art. It is intended to cover all modifications inherent in the invention which is not therefore to be limited or otherwise restricted, except by the prior art and the scope of the appended claims.

We claim as our invention:
1. The method of protecting ferrous metal against corrosion due to contact of the ferrous metal surface with corrosive agents encountered in oil and gas wells, which comprises applying to the ferrous metal surface a compound of the formula

$$(R\text{---}Ar\text{---}R_1)_nX$$

in which R represents 1–2 aliphatic groups of 4 to 30 carbon atoms inclusive, Ar represents a member selected from the group consisting of benzene and naphthalene radicals, $R_1$ represents a saturated alkylene radical of 1 to 5 carbon atoms inclusive, X represents a polyamine residue of the formula $$-NR_2[(\overset{R_3}{\overset{|}{C}}H)_mNR_4]_qH$$

in which $R_2$, $R_3$ and $R_4$ are members selected from the group consisting of hydrogen, and lower hydroxyalkyl, poly-lower alkylene oxide and lower aliphatic hydrocarbon radicals, and in which n, m and q are in the range 1 to 6 inclusive; and wherein n may also represent fractional numbers greater than unity to represent mixtures of N-alkylarylalkyl substituted alkylene polyamines having an average degree of substitution of n.

2. The method of protecting ferrous metal against corrosion due to contact of the ferrous metal surface with corrosive agents encountered in oil and gas wells, which comprises applying N-dodecylbenzyldiethylenetriamine to the ferrous metal surface.

3. The method of protecting ferrous metal against corrosion due to contact of the ferrous metal surface with corrosive agents encountered in oil and gas wells, which comprises applying N-dodecylbenzylethylenediamine to the ferrous metal surface.

4. The method of protecting ferrous metal against corrosion due to contact of the ferrous metal surface with corrosive agents encountered in oil and gas wells, which comprises applying dodecylbenzyltriethylenetetramine to the ferrous metal surface.

5. The method of protecting ferrous metal against corrosion due to contact of the ferrous metal surface with corrosive agents encountered in oil and gas wells, which comprises applying didodecylbenzyldiethylenetriamine to the ferrous metal surface.

6. A high melting solid stick-form corrosion inhibitor for oil and gas well equipment, said inhibitor having a specific gravity in excess of approximately 1.5 and having the composition: (a) 80 to 35 parts by weight of oxidized mineral wax; (b) 20 to 65 parts by weight of a compound of the formula $$(R\text{---}Ar\text{---}R_1)_nX$$

in which R represents 1–2 aliphatic groups of 4 to 30 carbon atoms inclusive, Ar represents a member selected from the group consisting of benzene and naphthalene radicals, $R_1$ represents a saturated alkylene radical of 1 to 5 carbon atoms inclusive, X represents a polyamine residue of the formula $$-NR_2[(\overset{R_3}{\overset{|}{C}}H)_mNR_4]_qH$$

in which $R_2$, $R_3$ and $R_4$ are members selected from the group consisting of hydrogen, and lower hydroxyalkyl, poly-lower alkylene oxide and lower aliphatic hydrocarbon radicals, and in which n, m and q are in the range 1 to 6 inclusive; and wherein n may also represent fractional numbers greater than unity to represent mixtures of N-alkylarylalkyl substituted alkylene polyamines having an average degree of substitution of n, and (c) a finely divided weighting agent in amount to give said specific gravity.

7. A high melting solid stick-form corrosion inhibitor for oil and gas well equipment, said inhibitor having a specific gravity in excess of approximately 1.5 and having the composition: (a) 80 to 35 parts by weight of oxidized mineral wax; (b) 20 to 65 parts by weight of N-dodecylbenzyldiethylenetriamine; and (c) a finely divided weighting agent in amount to give said specific gravity.

8. A high melting solid stick-form corrosion inhibitor for oil and gas well equipment, said inhibitor having a specific gravity in excess of approximately 1.5 and having the composition: (a) 80 to 35 parts by weight of oxidized mineral wax; (b) 20 to 65 parts by weight of N-dodecylbenzylethylenediamine; and (c) a finely divided weighting agent in amount to give said specific gravity.

9. A high melting solid stick-form corrosion inhibitor for oil and gas well equipment, said inhibitor having a specific gravity in excess of approximately 1.5 and having the composition: (a) 80 to 35 parts by weight of oxidized mineral wax; (b) 20 to 65 parts by weight of dodecylbenzyltriethylenetetramine; and (c) a finely divided weighting agent in amount to give said specific gravity.

10. A high melting solid stick-form corrosion inhibitor for oil and gas well equipment, said inhibitor having a specific gravity in excess of approximately 1.5 and having the composition: (a) 80 to 35 parts by weight of of oxidized mineral wax; (b) 20 to 65 parts by weight of didodecylbenzyldiethylenetriamine; and (c) a finely divided weighting agent in amount to give said specific gravity.

11. A high melting solid stick-form corrosion inhibitor for oil and gas well equipment, said inhibitor having a specific gravity in excess of approximately 1.5 and having the composition: (a) 80 to 35 parts by weight of oxidized mineral wax; (b) 20 to 65 parts by weight of lower hydroxy-alkylated N-dodecylbenzyldiethylenetriamine having not over two lower hydroxyalkyl groups per molecule; and (c) a finely divided weighting agent in amount to give said specific gravity.

12. A high melting solid stick-form corrosion inhibitor for oil and gas well equipment, said inhibitor having a specific gravity in excess of approximately 1.5 and having the composition: (a) 80 to 35 parts by weight of oxidized mineral wax; (b) 20 to 65 parts by weight of hydroxyethyl N-dodecylbenzyldiethylenetriamine having not over two hydroxyethyl groups per molecule; and (c) a finely divided weighting agent in amount to give said specific gravity.

References Cited in the file of this patent

UNITED STATES PATENTS

| | | |
|---|---|---|
| 2,164,565 | Britton et al. | July 4, 1939 |
| 2,196,261 | Howland et al. | Apr. 9, 1940 |
| 2,460,259 | Kahler | Jan. 25, 1949 |
| 2,584,086 | Wachter et al. | Jan. 29, 1952 |
| 2,599,385 | Gross et al. | June 3, 1952 |
| 2,659,693 | Lytle | Nov. 17, 1953 |
| 2,688,368 | Rodgers et al. | Sept. 7, 1954 |
| 2,739,871 | Senkus | Mar. 27, 1956 |
| 2,833,712 | Jones | May 6, 1958 |

FOREIGN PATENTS

| | | |
|---|---|---|
| 762,228 | Great Britain | Nov. 28, 1956 |
| 1,105,891 | France | Dec. 8, 1955 |